United States Patent [19]

Scarlata

[11] Patent Number: 4,707,215

[45] Date of Patent: Nov. 17, 1987

[54] SHEET BINDING CARTRIDGE

[75] Inventor: Richard F. Scarlata, Rochester, N.Y.

[73] Assignee: Xerox Corporation, Stamford, Conn.

[21] Appl. No.: 794,887

[22] Filed: Nov. 4, 1985

[51] Int. Cl.[4] ........................ B65C 11/04; B05C 3/02; B42C 9/00; A01J 21/00

[52] U.S. Cl. .................................... 156/578; 156/908; 118/407; 412/37; 425/461

[58] Field of Search ............... 156/356, 578, 295, 361, 156/558, 563, 566, 908; 118/407, 410, 411, 412, 413; 412/37, 8, 901, 902; 264/241, 263, 252, 271.1; 425/461, 466

[56] References Cited

U.S. PATENT DOCUMENTS

| | | | |
|---|---|---|---|
| 1,785,261 | 12/1930 | Howard . | |
| 2,197,988 | 4/1940 | Tanzi | 425/466 |
| 3,117,342 | 1/1964 | Koppehele | 425/466 |
| 4,153,276 | 5/1979 | Ohlsson | 412/37 |
| 4,201,615 | 5/1980 | French | 118/407 |
| 4,473,425 | 9/1984 | Baughman et al. | 150/364 |
| 4,512,945 | 4/1985 | Vigano | 156/578 |
| 4,537,650 | 8/1985 | Coons, Jr. | 156/578 |

FOREIGN PATENT DOCUMENTS

| | | | |
|---|---|---|---|
| 3203068 | 8/1983 | Fed. Rep. of Germany | 412/8 |
| 4215 | 12/1983 | PCT Int'l Appl. | 412/8 |

*Primary Examiner*—Donald E. Czaja
*Assistant Examiner*—Louis Falasco
*Attorney, Agent, or Firm*—H. Fleischer; J. E. Beck; R. Zibelli

[57] ABSTRACT

The present invention is an operator replaceable cartridge which is used in an apparatus for binding together a plurality of sheets to form a bound booklet. The flow of adhesive stored in the chamber of the housing is regulated to control the distribution of the adhesive on an applicator blade. The applicator blade is mounted on the housing and is of the length at least equal to the length of the marginal region of the sheet. In operation, the applicator blade reciprocates into and out of contact with the marginal region of the sheet to form a line of adhesive thereon.

9 Claims, 6 Drawing Figures

SHEET BINDING CARTRIDGE

This invention relates generally to a printing system of the type having an electrophotographic printing machine and a finishing station. More particularly, this invention concerns a finishing station having an operator replaceable cartridge for binding together a plurality of sheets to form a booklet thereof which is used therein.

A typical electrophotographic printing machine employs a photoconductive member which is charged to a substantially uniform potential so as to sensitize the surface thereof. The charged portion of the photoconductive member is exposed to a light image of an original document being reproduced. Exposure of the charged photoconductive member selectively disipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

Frequently, in commercial printing systems of the foregoing type, the copy sheets with the information permanently affixed thereto, are transported to a finishing station. After the requisite number of sheets, corresponding to a set of original documents is compiled in the finishing station, the copies of the set are permanently affixed to one another to form a booklet thereof. Most frequently, a stapling apparatus is employed to secure the sheets to one another to form the booklet. However, other alternative techniques have been used such as adhesively binding the sheets to one another. Often, the printing system employs a recirculating document handling system to advance successive original documents from a stack thereof to the exposure station of the electrophotographic printing machine for reproduction. When a recirculating document handling system is employed, the printing system produces a large number of copies rapidly. This type of system may be employed to form sets or a booklet of copies. In order for each set to have a bound, finished look, it is desirable to adhesively secure the sheets of the set to one another. Numerous methods are known in the art for adhesively securing sheets to one another. It is particularly desirable to be capable of adhesively binding small sets or booklets numbering from two to fifty pages in a relatively simple and inexpensive fashion.

Various approaches have been devised to adhesively bind sheets to one another. The following disclosures appear to be relevant.

U.S. Pat. No. 1,785,261
Patentee: Howard
Issued: Dec. 16, 1930

PCT Publication: WO83/04215
Inventor: Baughman et al.
Published: Dec. 8, 1983

U.S. Pat. No. 4,537,650
Patentee: Coons
Issured: Aug. 27, 1985

The relevant portions of the foregoing disclosures may be briefly summarized as follows:

Howard describes an adhesive binder which employs presser bars to hold a sheet in position to receive glue. Jogger plates align the sheets. A glue knife comprising a vertically moving blade receives glue from a supply belt and applies a line of glue to the sheets. In operation, the glue knife is brought into contact with the sheets to apply glue to the upper surface of the folded tongues at the ends thereof. Each successive pair of sheets is pressed onto the sheet below it by the glue knife and presser bars so that the tongues on alternate sheets will be joined together by the glue.

Baughman et al describes a sheet binding apparatus for use with a high speed document copier. The sheet binding apparatus is adapted to receive sheets moving along a first path and to apply adhesive adjacent to a edge of such sheets as they move in a direction perpendicular to the path. The binding apparatus includes a sheet drive mechanism for altering the direction of movement of the received sheets so as to advance the sheets along a second path which is substantially parallel with the edge to which the adhesive is to be applied. An adhesive applicator is stationarily positioned along the second path to apply a strip of adhesive to the sheets as they move therepast. After the adhesive is applied, the sheets are stacked, in registration, with the adhesive interposed between adjacent sheets.

Coons discloses an operator replaceable cartridge having a housing storing a supply of adhesiver therein. A glue applicator blade is positioned in the housing with a portion thereof extending therefrom. The glue applicator blade is of the length at least equal to the length of a marginal region of a sheet adapted to have glue deposited thereon. The housing with the glue applicator blade is reciprocated into and out of contact with a marginal region of the sheets advanced thereto in seriatim. The glue applicator blade forms a line of adhesive on the marginal region of each sheet. The sheets are overlaid and pressed together to form a bound booklet.

In accordance with one aspect of the features of the present invention, there is provided an operator replaceably cartridge in an apparatus which binds together a plurality of sheets to form a bound booklet thereof. The apparatus includes a housing defining a chamber arranged to store a supply of adhesive therein. Means regulate the flow of the adhesive being stored in the chamber of the housing. An applicator blade is mounted on the housing. The applicator blade is in communication with the chamber of the housing for receiving adhesive therefrom. The regulating means regulates the flow of the adhesive in the chamber to control the distribution of the adhesive on the applicator blade.

Pursuant to another aspect of the features of the present invention, there is provided an apparatus for adhesively binding together a plurality of sheets to form a bound booklet thereof. Means are provided for receiving successive sheets. An operator replaceable cartridge is used. The cartridge comprises a housing defining a chamber arranged to store a supply of adhesive therein. Means regulate the flow of the adhesive stored in the chamber of the housing. An applicator blade is mounted on the housing in communication with the chamber therein for receiving adhesive therefrom. The regulating means regulates the flow of the adhesive in the chamber to control the distribution of adhesive on the applicator blade. Means are provided for reciprocating the cartridge so that a portion of the applicator blade contacts the marginal region of successive sheets in the receiving means to apply a strip of adhesive thereon.

Other aspects of the invention will become apparent as the following description proceeds and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
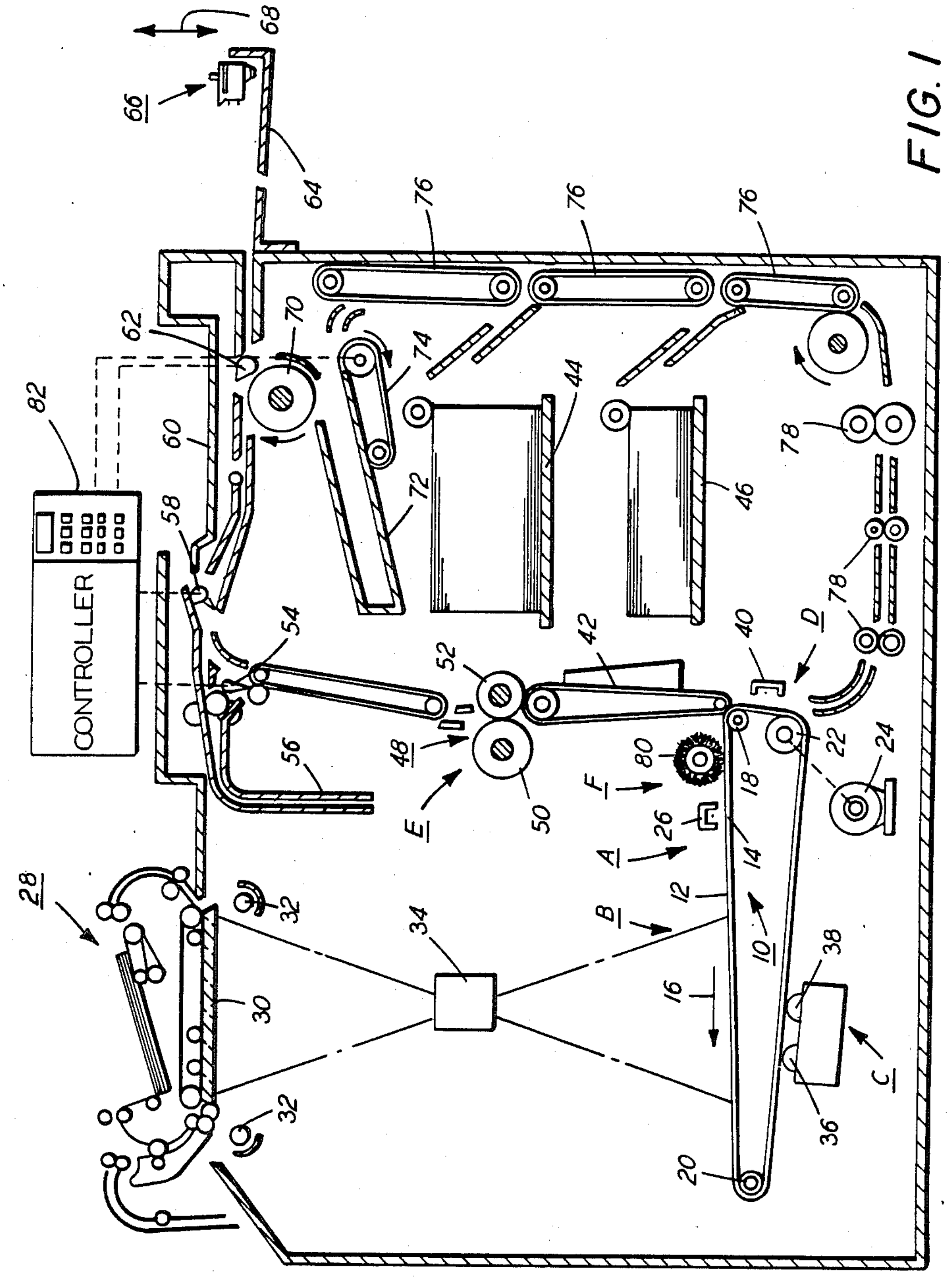
FIG. 1 is a schematic elevational view depicting an electrophotographic printing machine incorporating the features of the present invention therein.

For a general understanding of the features of the present invention, reference is made to the drawings. In the drawings, like reference numerals have been used throughout to designate identical elements. FIG. 1 schematically depicts an illustrative printing system incorporating an electrophotographic printing machine and a finishing station employing the sheet binding apparatus of the present invention therein. It will become evident from the following discussion that the sheet binding apparatus is equally well suited for use in a wide variety of printing systems, and is not necessarily limited in its application to the particular printing system shown herein.

Referring initially to the electrophotographic printing machine employed in the printing system, the various processing stations employed are well known and will be shown hereinafter schematically with their operation described briefly with reference to FIG. 1.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Other suitable photoconductive materials and conductive substrates may also be employed. Belt 10 moves in the direction of arrow 16 to advance successive portions of photoconductive surface 12 sequentially through the various processing stations disposed about the path of movement thereof. Belt 10 is entrained about a stripping roller 18, tensioning roller 20 and drive roller 22. Stripping roller 18 is mounted rotatably so as to rotate with the movement of belt 10. Tensioning roller 20 is resiliently urged against belt 10 to maintain belt 10 under the desired tension. Drive roller 22 is rotated by motor 24 coupled thereto by suitable means such as a belt drive. As roller 22 rotates, it advances belt 10 in the direction of arrow 16.

Initially, a portion of the photoconductive surface passes through charging station A. At charging station A, a corona generating device, indicated generally by the reference numeral 26, charges photoconductive surface 12 to a relatively high, substantially uniform potential.

Next, the charged portion of photoconductive surface 12 is advanced through imaging station B. At imaging station B, a document handling unit, indicated generally by the reference numeral 28, is positioned over platen 30 of the printing machine. Document handling unit 28 sequentially feeds documents from a stack of documents placed therein by the operator in a face-down normal forward collated order. A document feeder forwards the bottommost document of the stack to a pair of take away rollers. The sheet is then fed by the rollers through a document guide to a belt. The belt advances the document onto platen 30. After imaging, the original document is fed from platen 30 by the belt into a guide and feed roll pairs. The document then advances into an inverter mechanims or back to the document stack. A decision gate is provided to divert the document either to the inverter or back to the document stack. Imaging of a document is achieved by lamps 32 which illuminate the document on platen 30. Light rays reflected from the document are transmitted through lens 34. Lens 34 focuses the light image of the original document onto the charged portion of photoconductive surface 12 of belt 10 to selectively dissipate the charge thereon. This records an electrostatic latent image on photoconductive surface 12 which corresponds to the informational areas contained within the original document. Thereafter, belt 10 advances the electrostatic latent image recorded on photoconductive surface 12 to development station C.

At development station C, a pair of magnetic brush developer rollers, indicated generally by the reference numerals 36 and 38 advance developer material into contact with the electrostatic latent image. The latent image attracts toner particles from the carrier granules of the developer material to form a toner powder image on photoconductive surface of belt 10.

Belt 10 then advances the toner powder image to transfer station D. At transfer station D, a copy sheet is moved into contact with the powder image. Transfer station D includes a corona generating device 40 which sprays ions onto the backside of the copy sheet. This attracts the toner powder image from photoconductive surface 12 to the sheet. After transfer, conveyor 42 advances the sheet to fusing station E.

The copy sheets are advanced from a selected one of the trays 44 or 46 to transfer station D. After transfer of the toner powder image to the first side of the copy sheet, the copy sheet is advanced by conveyor 42 to fusing station E. Fusing station E includes a fuser assembly, indicated generally by the reference numeral 48, which permanently affixes the transferred powder image to the copy sheet. Preferably, fuser assembly 48 includes a heated fuser roller 50 and back-up roller 52 with the powder image contacting fuser roller 50. In this manner, the powder image is permanently affixed to the copy sheet.

After fusing, the copy sheets are fed to gate 54 which functions as an inverter selector. Depending upon the position of gate 54, the copy sheets will be deflected into sheet inverter 56, or will bypass inverter 56 and be fed directly to a second decision gate 58. The sheets which bypass inverter 56 turn a 90 degree corner in the sheet path before reaching gate 58. At gate 58, the sheet is in a face-up orientation with the imaged side, which has been fused, face-up. If inverter path 56 is selected, the opposite is true, i.e. the last printed side is face-down. Decision gate 58 either deflects the sheet directly into an open output tray 60 or deflects the sheet into a transport path which carries the sheet to a third decision date 62. Gate 62 either passes the sheet directly to the finishing station or onto duplex inverter roll 70. At the finishing station, the sheets move into compiler tray 64 of sheet binding apparatus 66. Sheet binding apparatus 66 reciprocates in the direction of arrow 69 so that the applicator blade thereof contacts the leading marginal edge of the sheet to form a line of adhesive thereon. Gate 62 may also deflect the sheet onto duplex inverter roll 70. Roll 70 inverts and stacks the sheets to be duplexed into the duplex tray 72 when gate 62 so directs. Duplex tray 72 provides an intermediate or buffer storage for those sheets which have been printed on one side and on which an image will be subsequently printed on the second, opposed side thereof, i.e. the sheets being duplexed. Due to sheet inverting by roller 70, the sheets are stacked in tray 72 face-down on top of one another in the order in which they are copied. In order to complete duplex copying, the simplex sheets in tray 72 are fed, in seriatim, by bottom feeder 74 from tray 72 back to transfer station D to transfer of the toner powder image to the opposed side of the copy sheet. Conveyors 76 and rollers 78 advance the sheet along the path which produces an inversion thereof. However, inasmuch as the bottommost sheet is fed from duplex tray 72, the proper or clean side of the sheet is positioned in contact with belt 10 at transfer station D so that the toner powder image path as the simplex sheet to be stacked in tray 60 or when the adhesive binding option is selected, in tray 64.

Invariably, after the copy sheet is separated from photoconductive surface 12 of belt 10, some residual particles remain adhering thereto. These residual particles are removed from photoconductive surface 12 at cleaning surface F. Cleaning station F includes a rotatably mounted fiberous brush 80 in contact with photoconductive surface 12 of belt 10. The particles are cleaned from photoconductive surface 12 of belt 10 by the rotation of brush 80 in contact therewith. Subsequent to cleaning, a discharge lamp, (not shown) floods photoconductive surface 12 with light to dissipate any residual electrostatic charge remaining thereon prior to the charging thereof for the next imaging cycle.

Controller 82 is preferably a programmable microprocessor which controls all of the machine functions hereinbefore described. The controller provides a comparison of counts of the copy sheets, the number of documents being recirculated in the recirculating document handling unit, the number of copy sheets selected by the operator, time delays, jam correction, etc. The control of all the exemplary systems heretofore described may be accomplished by conventional control switch inputs from the printing machine console selected by the operator. Conventional sheet path sensors or switches may be utilized for keeping track of the position of the document and the copy sheets. In addition, controller 82 regulates the various positions of the decision gates dependent upon the mode of operation selected. Thus, when the operator selects the adhesive binding mode, adhesive binder 66 will be energized and the decision gates oriented so as to advance either the simplex or duplex copy sheets to compiler tray 64. Adhesive binder 66 will reciprocate to deposit a line of glue on the leading marginal region of successive sheets advanced to tray 64, in seriatim. It is believed that the foregoing description is sufficient for purposes of the present application to illustrate the general operation of a printing system incorporating the features of the present invention.

Figure 2:
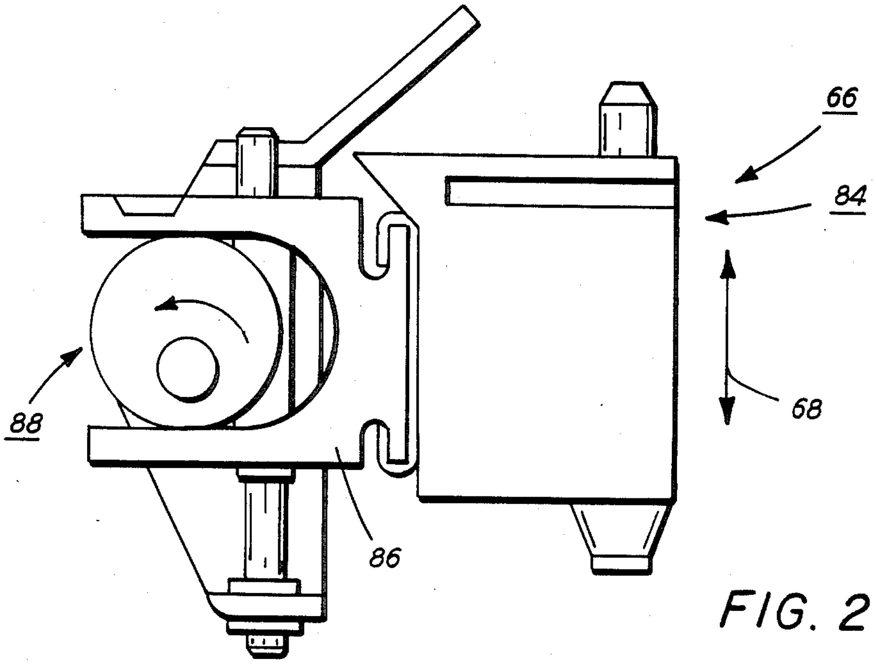
FIG. 2 is a schematic elevational view showing the sheet binding apparatus used in the FIG. 1 printing machine.

Referring now to the specific subject matter of the present invention, the general operation of adhesive binder 66 will be described hereinafter with reference to FIGS. 2 through 6, inclusive. As shown in FIG. 2, the adhesive binder, indicated generally by the reference numeral 66, comprises an operator replaceable cartridge, indicated generally by the reference numeral 84. Cartridge 84 is mounted slidably on frame 86. Frame 86 is constrained to move only in the direction of arrow 68. A slider crank mechanism, indicated generally by the reference numeral 88 is coupled to frame 86. An incremental motion wrapped spring clutch is used to transmit power from the main drive system of the printing machine to slider crank mechanism 88. When controller 82 indicates that the adhesive binding mode of operation has been selected, and the copy sheet has been transported to compiler tray 64, the machine drive system is coupled to slider crank mechanism 88. When so coupled, slider crank mechanism 88 reciprocates cartridge 84 in the direction of arrow 68. Other suitable devices may also be used to reciprocate cartridge 84 in the direction of arrow 68. For example, cartridge 84 may be reciprocated vertically and stored with the applicator blade above the cartridge 84. In this position, the adhesive on the applicator blade drains back into cartridge 84. Thus, the cartridge moves vertically and rotates. This type of motion is similar to that of a date ink stamp pad made by the Eagle Zephyr Corporation.. After the last copy sheet is advanced to compiler tray 64, the set of copy sheets may be removed from the copy machine. One skilled in the art will appreciate that the first and last copy sheet need not necessarily be sheets, but may be covers with preprinted information thereon, if so desired, or in the alternative, photographs or colored sheets. Furthermore, any other desired information may be interleafed between the copy sheets, such as photographs, to provide additional material in the booklet.

Figure 3:
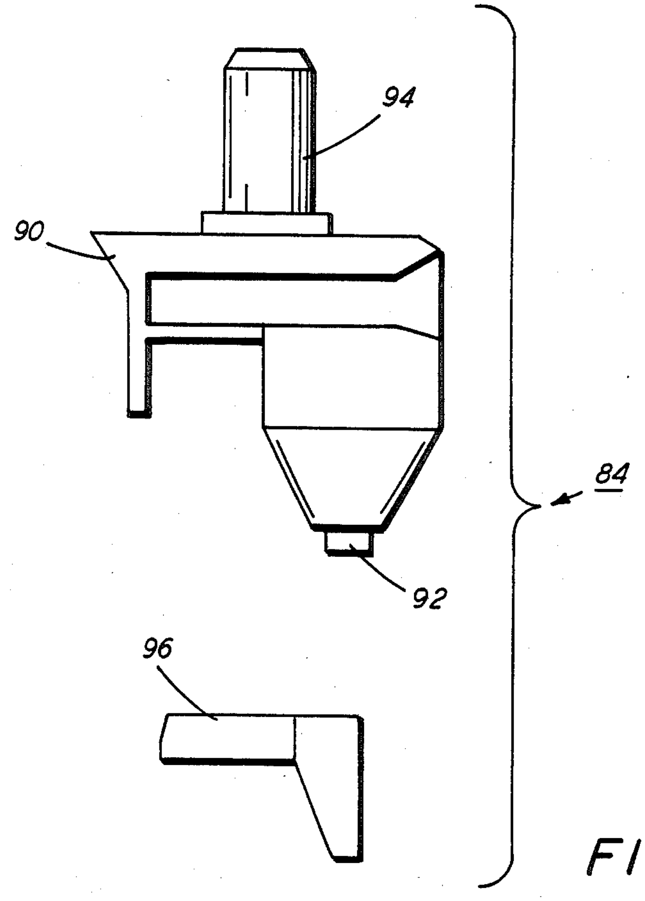
FIG. 3 is an exploded, elevational view depicting the operator replaceable cartridge of the FIG. 2 binding apparatus.

Turning now to FIG. 3, there is shown the details of cartridge 84. As shown thereat, cartridge 84 includes an upper housing 90 having applicator blade 92 mounted thereon. A nozzle 94 extends upwardly from housing 90 provides an entrance port through which adhesive may be supplied to the interior chamber of cartridge 84. Nozzle 94 is cylindrical so that adhesive may flow through the central passageway therein into the chamber of cartridge 84 which is defined by interfitting lower housing 96 with upper housing 90. Upper housing 90 has a plurality of gates and ramps molded integrally therein so as to regulate the flow of adhesive in the chamber thereof. In this way, the adhesive flowing onto applicator blade 92 may be uniformly distributed thereon. Alternatively, the adhesive may non-uniformly distributed thereon, if so desired. For example, a greater amount of adhesive may be deposited on the ends of the applicator blade than in the central region thereon. Applicator blade 92 is preferably made from a foam wick material. Both upper housing 90 and lower housing 96 are molded from any suitable plastic material which can be joined permanently and remains structurally rigid when reciprocated into and out of contact with the copy sheets. In this way, blade 92 will remain in contact with the entire marginal region of the copy sheet to insure the deposition of a thin film of adhesive thereon. This results in less wetting of the copy sheet which reduces paper fiber expansion and contraction or ripple. Upper housing 90 has molded integrally therein ramps and gates. Together, the ramps and gates provide the precision required to distribute the adhesive uniformly across blade 92 even though the supply of adhesive to the chamber from nozzle 94 is from one location. In addition, the internal flow pattern offers the flexibility of customizing the flow to blade 92 to dispense non-uniformly, if so desired. Moreover, this technique can be adapted to different lengths of paper, simply by changing the length of the applicator blade and flow pattern. It is clear that the cartridge is readily replaceable by the machine operator. A cartridge of this type is comparatively simple and inexpensive when compared to complex adhesive dispensers and flow metering systems.

Figure 4:
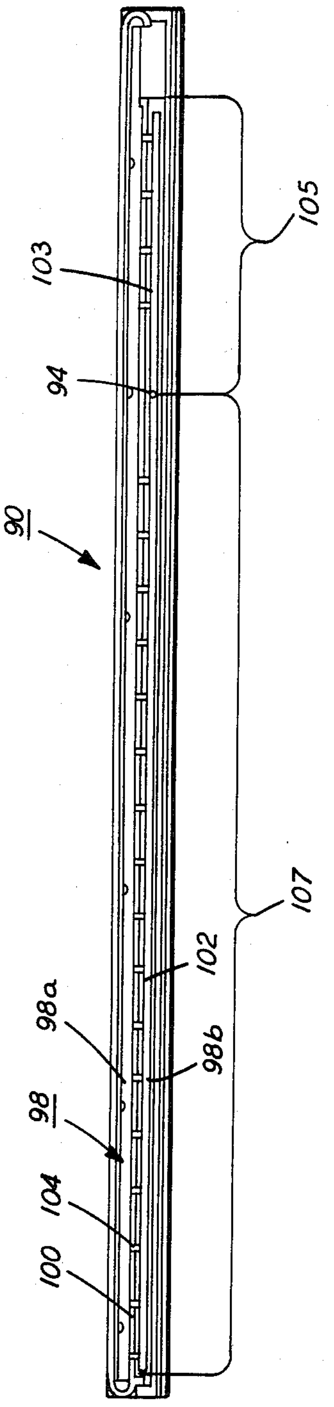
FIG. 4 is a planar, elevational view of the upper portion of the FIG. 3 cartridge showing the structure thereof for controlling the flow of adhesive.

Turning now to FIG. 4, there is shown upper housing 90 in greater detail. As depicted thereat, upper housing 90 includes a chamber 98 for receiving adhesive from nozzle 94. A plate, i.e. a dividing rib or wall, 100 is positioned substantially in the center of chamber 98 and extends along the longitudinal axis of upper housing 90. Plate 100 extends upwardly from the upper surface of housing 90 in chamber 98 and divides chamber 98 into portions **98*a* and 98*b*. A ramp 102 exends in a longitudinal direction from one end of chamber portion 98*b* of upper housing 90 to nozzle 94. Another ramp 103 extends in a longitudinal direction from the other end of chamber portion 98*b* to nozzle 94. Ramps 102 and 103 slope downwardly from their respective end portions in chamber portion 98*b* to nozzle 94 forming a V-shape. One planar surface of plate 100 is in juxtaposition with a surface of ramps 102 and 103 substantially normal to the sloping suface of ramps 102 and 103. Plate 100 has a plurality notches 104 therein. The notches on opposed sides of nozzle 94 are spaced a greater distance from one another than the other notches in plate 100. The notches 104 in region 105 of plate 100 are spaced further apart from one another than the notches 104 in region 107 of plate 100. However, notches 104 in region 105 of plate 100 are substantially equally spaced from one another. Similarly, notches 104 in region 107 of plate 100 are also substantially equally spaced from one another. Notches 104 act as gates permitting adhesive to flow from the entrance side, i.e. chamber portion 98*b*, to the distribution side thereof, i.e. chamber portion 98*a*. A portion of blade 92 extends into chamber portion 98*a*. Blade 92 will only absorb adhesive when chamber portion 98*a* is substantially filled with adhesive. The relative size of notches 104 and the spacing thereof, as well as the slope of ramp 102 and 103 are determinative in defining the distribution of the adhesive on blade 92. Thus, the upper housing has nozzle 94 extending outwardly therefrom with plate 100 and ramps 102 and 103 molded integrally therein. A separable lower housing 96 mates with upper housing 90 to form cartridge 84. Cartridge 84 is formed with a slot therein extending in the longitudinal direction thereof. Applicator blade 92 is mounted on upper housing 90 so that at least a portion thereof extends through the slot into chamber portion 98*a*** so as to receive adhesive thereat.

Figure 5:
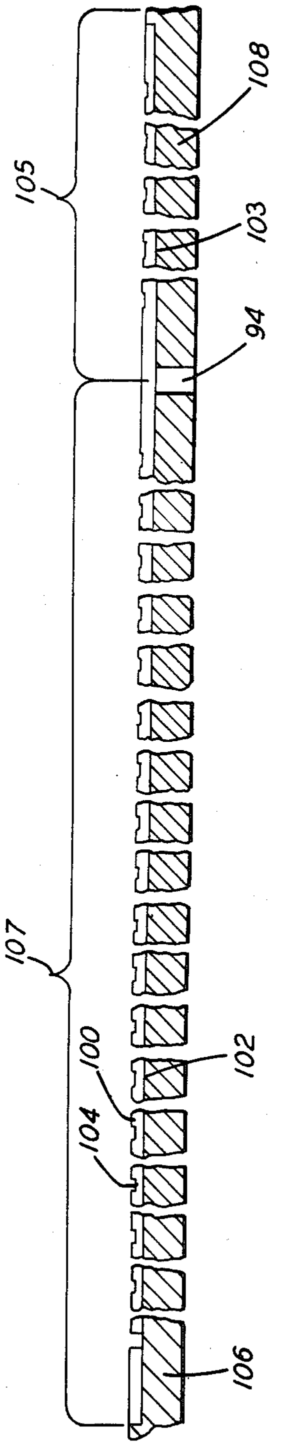
FIG. 5 is a fragmentary, sectional, elevational view of the upper portion of the FIG. 3 cartridge.

Referring now to FIG. 5, there is shown a fragmentary, sectional elevational view depicting ramp 102, plate 100 and notches 104 in greater detail. As shown thereat, ramp 102 slopes downwardly in a longitudinal direction, from one side of upper housing 90 to nozzle 94. Similarly, ramp 103 slopes downwardly from the other side of housing 90 to nozzle 94. The ramps 102 and 103 intersect at nozzle 94 in a V-shaped configuration. Thus, the distance between the upper edge of plate 100 and the sloping surface of ramp 102 is at a minimum on side 106 of housing 90 and at a maximum at nozzle 94. The distance between the uppermost surface of plate 100 and ramp 103 is at a minimum on side 106 and at maximum at nozzle 94. The depths of notches 104 vary from side 106 to side 108 of housing 90. Thus, the depth of notches 104 may range from 0.39 millimeters on side 106 to 0.09 millimeters on side 108. However, the depth of the notches does not necessarily change linearly. The depth of each notch is selected to provide the desired flow pattern in cartridge 84 so as to insure the desired distribution of adhesive on blade 92. The distribution of adhesive on blade 92 is controlled as a function of the distribution of adhesive in chamber portion **98*a*. It is, thus, clear that the depth, as well as the spacing between adjacent notches and the slope of ramps 102 and 103 act to control the flow of adhesive from chamber portion 98*b* to chamber portion 98*a*. The adhesive flow into chamber portion 98*a* from chamber portion 98*b* is substantially uniform insuring a substantially uniform absorption of adhesive by blade 92**.

Figure 6:
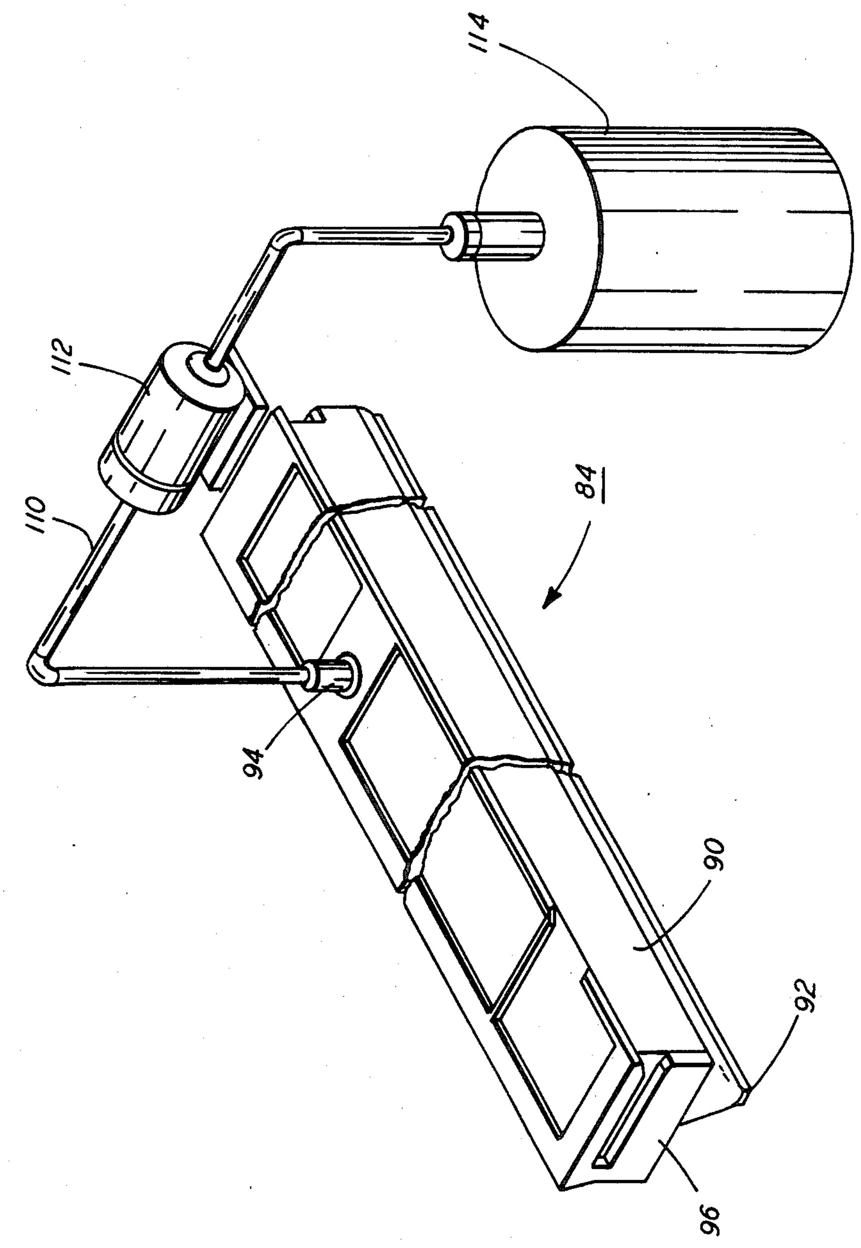
FIG. 6 is a perspective view illustrating one technique for continually maintaining the level of the adhesive within the FIG. 2 cartridge at the desired level.

Referring now to FIG. 6, a flexible conduit 110 is connected to nozzle 94 of cartridge 84. Conduit 110 couples cartridge 84 to a peristaltic pump 112 and container 114. Pump 112 controls the flow rate or amount of adhesive being furnished to chamber portion **98*b*. Thus, cartridge regulates the distribution of adhesive on blade 92 with pump 112 controlling the amount adhesive being absorbed by blade 92**.

In recapitulation, during operation, the machine operator selects the adhesive binding mode. The adhesive binder is energized, and after the first sheet is aligned and registered in the compiler tray, the cartridge is moved in a downwardly direction to deposit a thin line of glue on the leading marginal edge of the sheet. After the line of glue has been deposited on the sheet, the cartridge moves in an upwardly direction spacing the applicator blade thereon from the sheet. The next copy sheet is then transported into the compiler tray over the prior copy sheet aligned, and registered therein. At this time, the cartridge moves once again in a downwardly direction to deposit a line of glue on the copy sheet in the marginal region thereof. This operation continues until the last copy sheet is advanced into the compiler tray. At this time, the set of sheets or booklet may be removed therefrom. The cartridge of the present invention is operator replaceable in the printing machine being a throw away type of structure. The structure has molded integrally therewith, ramps and a plate having a plurality of notches therein to define gates which regulate the flow of adhesive onto the applicator blade. The distribution of the adhesive on the applicator blade may be controlled so as to be substantially uniform or non-uniform. It is evident that a cartridge of the foregoing type is relatively simple to manufacture and inexpensive.

It is, therefore, evident that there has been provided in accordance with the present invention an operator replaceable cartridge for use in an adhesive binding apparatus which adhesively secures together sheets to form a booklet thereof. This cartridge fully satisfies the aims and advantages hereinbefore set forth. While this invention has been described in conjunction with a preferred embodiment thereof, it is evident that many alternatives, modifications, and variations would be apparent to those skilled in the art. Accordingly, it is intended to embrace all such alternatives, modifications, and variations as fall within the spirit and broad scope of the appended claims.

I claim:

1. An apparatus for adhesively binding together a plurality of sheets to form a bound booklet thereof, including:

means for receiving successive sheets;

an operator replaceable cartridge comprising a housing defining a chamber arranged to store a supply of adhesive therein and having an entrance port in communication with the chamber of the housing for receiving adhesive thereat, the housing including a plurality of gates and a plurality of ramps molded integrally into the chamber thereof, and an applicator blade mounted on the housing in communication with the chamber therein for receiving adhesive therefrom, the plurality of gates and the plurality of ramps distributing adhesive flowing from the entrance port onto the applicator blade; and means for moving said cartridge so that a portion of the applicator blade contacts the marginal region of successive sheets in said receiving means to apply a strip of adhesive thereon.

2. An apparatus according to claim 1, wherein one of the plurality of ramps extends in a longitudinal direction from one end of the chamber of the housing to the entrance port with the other one of the plurality of ramps extending from the other end of the chamber of the housing to the entrance port.

3. An apparatus according to claim 2, wherein the plurality of gates is a plate extending upwardly from the housing in the chamber thereof in the longitudinal direction with the planar surfaces of the plate being substantially normal to the sloping surface of the plurality of ramps and having a plurality of notches therein with one planar surface of the plate being in juxtaposition with a surface of the plurality of ramps substantially normal to the sloping surfaces, the plate being positioned in the chamber of the housing to define an elongated reservoir on a side thereof opposed to the plurality of ramps.

4. An apparatus according to claim 3, wherein the housing includes an upper member having the entrance port in a surface thereof with the plate and the plurality of ramps molded integrally therein and a separable lower member mating with the upper member to form the housing with a slot therein extending in the longitudinal direction thereof, the applicator blade being mounted on the housing so that at least a portion thereof extends through the slot into the reservoir to receive adhesive thereat.

5. An apparatus according to claim 4, wherein the applicator blade is a flexible wick.

6. An apparatus according to claim 5, wherein said applicator blade is of a length at least equal to the length of the marginal region of the sheet adapted to have adhesive deposited thereon.

7. An apparatus according to claims 6, further including:

means, positioned externally of said cartridge and in communication with the entrance port of the housing, for storing a supply of adhesive therein; and means, in communication with said storing means and the chamber of the housing of said cartridge for controlling the amount of adhesive being added to the chamber of said cartridge.

8. An apparatus according to claim 1, wherein the plurality of gates and the plurality of ramps control the flow of adhesive in the chamber of the housing to distribute adhesive substantially uniformly on the applicator blade.

9. An apparatus according to claim 1, wherein the plurality of gates and the plurality of ramps control the flow of adhesive in the chamber of the housing to distribute adhesive nonuniformly on the applicator blade.

* * * * *